(12) United States Patent  (10) Patent No.: US 9,753,304 B2
Hadden et al.  (45) Date of Patent: Sep. 5, 2017

(54) ADJUSTABLE EYEWEAR RETAINER

(71) Applicant: Chums, Inc., Salt Lake City, UT (US)

(72) Inventors: Richard Jeremy Hadden, White Salmon, WA (US); Sterling McMurrin, Bountiful, UT (US)

(73) Assignee: Chums, Inc., Salt Lake City, UT (US)

( * ) Notice: Subject to any disclaimer, the term of this patent is extended or adjusted under 35 U.S.C. 154(b) by 0 days.

(21) Appl. No.: 14/938,693

(22) Filed: Nov. 11, 2015

(65) Prior Publication Data

US 2017/0075133 A1 Mar. 16, 2017

Related U.S. Application Data

(60) Provisional application No. 62/216,465, filed on Sep. 10, 2015.

(51) Int. Cl.
*G02C 3/00* (2006.01)

(52) U.S. Cl.
CPC ............. *G02C 3/006* (2013.01); *G02C 3/003* (2013.01); *G02C 2200/18* (2013.01); *G02C 2200/20* (2013.01); *G02C 2200/32* (2013.01)

(58) Field of Classification Search
CPC ........ G02C 3/003; G02C 3/006; G02C 13/00; G02C 13/001; G02C 2200/04; G02C 2200/06; G02C 2200/18
USPC ........................................ 351/156, 157, 158
See application file for complete search history.

(56) References Cited

U.S. PATENT DOCUMENTS

| | | | |
|---|---|---|---|
| 181,937 A | 9/1876 | Haylock | |
| 182,013 A | 9/1876 | Andross | |
| 1,026,272 A | 5/1912 | Leveque | |
| 1,819,738 A | 8/1931 | Daniels et al. | |
| 2,649,020 A | 8/1953 | Wheeler | |
| 2,704,961 A | 3/1955 | Weil | |
| 3,450,467 A | 6/1969 | Phillips | |
| 3,673,610 A | 7/1972 | Liautaud | |
| 3,728,012 A | 4/1973 | Downey | |
| 4,133,604 A | 1/1979 | Fuller | |
| 4,541,696 A | 9/1985 | Winger et al. | |
| 4,692,002 A | 9/1987 | Meistrell | |

(Continued)

FOREIGN PATENT DOCUMENTS

| | | |
|---|---|---|
| AU | 680188 A | 7/1997 |
| DE | 29908337 U1 | 10/1999 |

(Continued)

OTHER PUBLICATIONS

US D608,385, 01/2010, Williams et al. (withdrawn)

(Continued)

*Primary Examiner* — Huy K Mai

(74) *Attorney, Agent, or Firm* — Stoel Rives LLP

(57) ABSTRACT

A device for retaining eyewear is disclosed. The device comprises one or more tethers rotatably coupled to a plurality of temple fasteners, the temple fasteners coupled to the temples of eyewear disposed on the ears of a user. More specifically, the device can further comprise a plurality of positioning members configured to couple with and rotate within a temple fastener to allow a tether coupled to the rotating position member to rotate relative to the head and neck of the user. The at least one tether can be disposed in various fixed positions relative to the head and neck of the user as well as relative to the eyewear.

20 Claims, 14 Drawing Sheets

(56) References Cited

U.S. PATENT DOCUMENTS

| | | |
|---|---|---|
| 4,696,556 A | 9/1987 | Perry |
| 4,793,702 A | 12/1988 | Ahrens et al. |
| 4,820,036 A | 4/1989 | Seet |
| 4,922,581 A | 5/1990 | Wilson |
| 4,955,710 A | 9/1990 | Meistrell |
| 5,015,085 A | 5/1991 | May |
| 5,074,656 A | 12/1991 | Parrish |
| 5,092,668 A | 3/1992 | Welch et al. |
| D328,908 S | 8/1992 | Kalbach |
| 5,181,052 A | 1/1993 | McClellan |
| 5,191,363 A | 3/1993 | Smith et al. |
| 5,247,814 A | 9/1993 | McDonald |
| 5,369,452 A | 11/1994 | Williams |
| 5,384,605 A | 1/1995 | Escobosa |
| 5,575,042 A | 11/1996 | Kalbach |
| 5,655,264 A | 8/1997 | Davancens et al. |
| 5,664,291 A | 9/1997 | Stoller |
| 5,735,393 A | 4/1998 | Shiue et al. |
| D411,562 S | 6/1999 | Riley |
| 6,053,612 A | 4/2000 | MacIntosh et al. |
| D432,556 S | 10/2000 | Lando |
| 6,182,334 B1 | 2/2001 | Davancens |
| 6,182,335 B1 | 2/2001 | Juda et al. |
| 6,233,345 B1 | 5/2001 | Urwyler |
| 6,247,811 B1 | 6/2001 | Rhoades et al. |
| 6,293,673 B1 * | 9/2001 | Hirschman ............ G02C 3/003 351/119 |
| 6,478,419 B1 | 11/2002 | McDaniel |
| 6,644,808 B1 | 11/2003 | Liu |
| D486,174 S | 2/2004 | Chisolm |
| D486,511 S | 2/2004 | Kalbach |
| 6,709,100 B2 | 3/2004 | Kalbach |
| 6,764,177 B1 | 7/2004 | Chisolm |
| 6,817,069 B1 | 11/2004 | Tillstrom |
| 6,941,619 B2 | 9/2005 | Mackay et al. |
| D513,519 S | 1/2006 | Chisolm |
| D536,364 S | 2/2007 | Kalbach |
| 7,284,855 B2 | 10/2007 | Bent |
| D567,279 S | 4/2008 | Chisolm et al. |
| 7,467,867 B1 | 12/2008 | Williams |
| D588,184 S | 3/2009 | Lane |
| D590,008 S | 4/2009 | Lane |
| D590,009 S | 4/2009 | Lane et al. |
| D590,434 S | 4/2009 | Lane et al. |
| D607,919 S | 1/2010 | Williams |
| 7,780,289 B2 | 8/2010 | Pettingill |
| 7,845,795 B2 | 12/2010 | Williams |
| 8,092,009 B2 | 1/2012 | Williams |
| 8,366,268 B2 | 2/2013 | Willaims |
| 8,523,350 B2 * | 9/2013 | Krisik .................... G02C 3/003 351/156 |
| 2001/0010727 A1 | 8/2001 | Urwyler |
| 2007/0046889 A1 | 3/2007 | Miller et al. |
| 2007/0248238 A1 | 10/2007 | Abreu |
| 2010/0177276 A1 | 7/2010 | Spinnato et al. |
| 2010/0271585 A1 | 10/2010 | Spinnato et al. |
| 2012/0105796 A1 | 5/2012 | Williams |
| 2015/0103308 A1 | 4/2015 | Williams |

FOREIGN PATENT DOCUMENTS

| | | |
|---|---|---|
| EP | 537390 A1 | 4/1993 |
| WO | 0053269 A1 | 9/2000 |
| WO | 2009137687 A2 | 11/2009 |

OTHER PUBLICATIONS

Cablz Marketing Flyer, 2009, 2 pages.
2009 ICAST New Product Showcase Entry Form and Official Rules, 2009, 4 pages.
"Croakies ARC Endless", http://store.corakies.com/arcendless.aspx, Mar. 30, 2015, 2 pages.
"ICAST 2009 Highlights", http://asafishing.org/shows-events/icast/archives/icast-2009-highlights/, Apr. 9, 2014, 1 pages.
"ICAST 2009 New Product Showcase", 3 pages.
"Sportfishing Industry Awards 2009 "Best of Show" Honors", http://www.asafishing.or/newsroom/news-releases/sportfishing-industry-awards-2009-best-of-show-honors/, Jul. 16, 2009, 6 pages.
"Videotaped Deposition of Michael Nussman as representative of ASA", In the United States District Court for the Northern District of Alabama Southern Division Case No. 2:14-CV-00091, *Cablz, Inc.*, vs. *Chums, Inc.*, Jul. 17, 2014, 8 pages.
"Videotapped Deposition of Kenneth Andres and ASA", In the United States District Court for the Northern District of Alabama Southern Division, Case No. 2:14-CV-00091, *Cablz, Inc.*, vs. *Chums, Inc.*, Jul. 17, 2014, 53 pages.
U.S. Appl. No. 12/142,323, United States Patent Application Prosecution through Jul. 7, 2014, 69 pages.
U.S. Appl. No. 12/640,872, United States Patent Application Prosecution through Jul. 17, 2014, 233 pages.
U.S. Appl. No. 12/991,668, United States Patent Application, 263 pages.
U.S. Appl. No. 12/991,668, United States Patent Application Prosecution through Jul. 7, 2014, 263 pages.
U.S. Appl. No. 13/346,492, United States Patent Application, 78 pages.
U.S. Appl. No. 13/660,706, United States Patent Application Prosecution through Jun. 5, 2014, 186 pages.
U.S. Appl. No. 13/660,706, United States Patent Application, 409 pages.
U.S. Appl. No. 14/307,122, United States Patent Application Prosecution through Jul. 17, 2014, 88 pages.
Croakies 1994 Catalog, 17 pages.
Croakies 1998 Catalog, 35 pages.
Croakies 2001 Catalog, 36 pages.
Eyewire Steel Non-Floating, http://floateyes.com/index.php/non-floating/ew-1.html, Aug. 27, 2014, 2 pages.
Monroe, "Outdoor Folks Don't Use Trendy Glasses-Holders", The Oregonian—Portland, Oregon, Jul. 4, 1991, 2 pages.
Sanchez, "Sunglasses, Meet Your New Best Friend", Outdoor USA Magazine, vol. 3, Issue 2, 2011, 2 pages.
Smith, "Top Picks: Most Innovative Products of 2010", FTR 52, Jul. 2010, 2 pages.

* cited by examiner

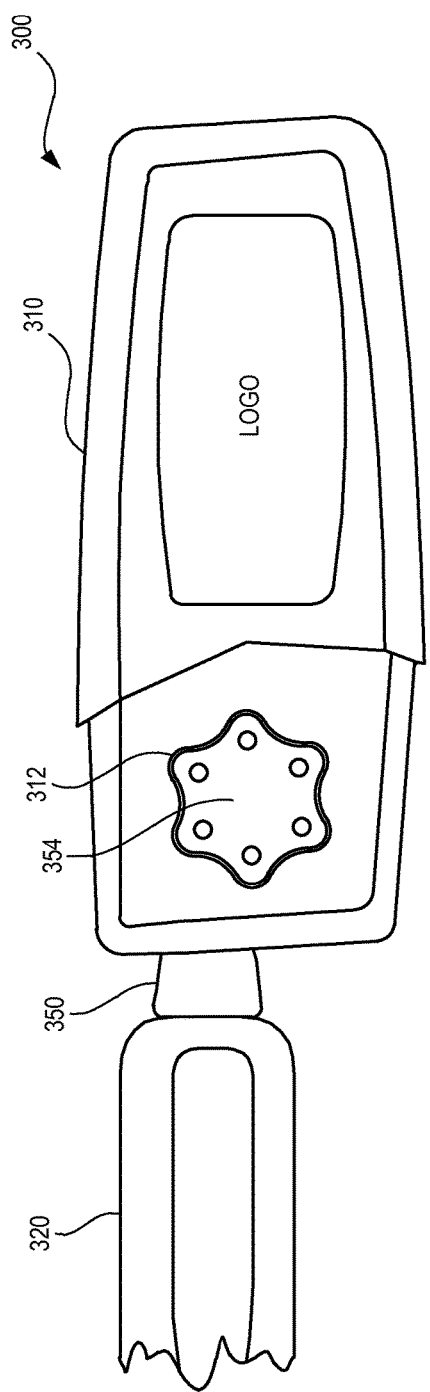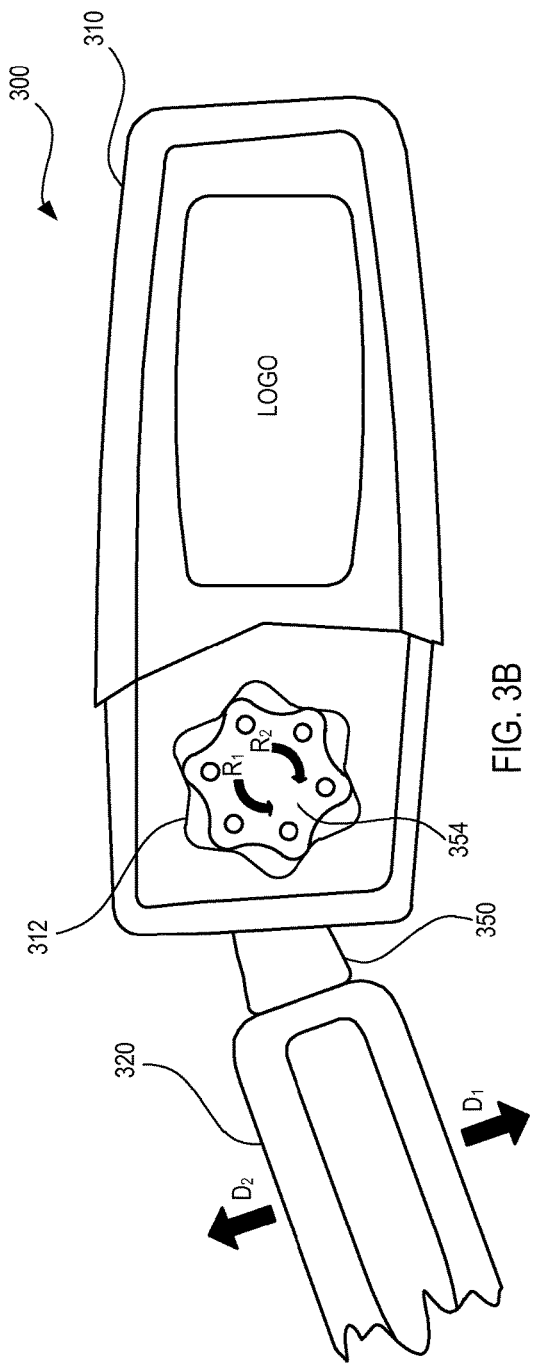

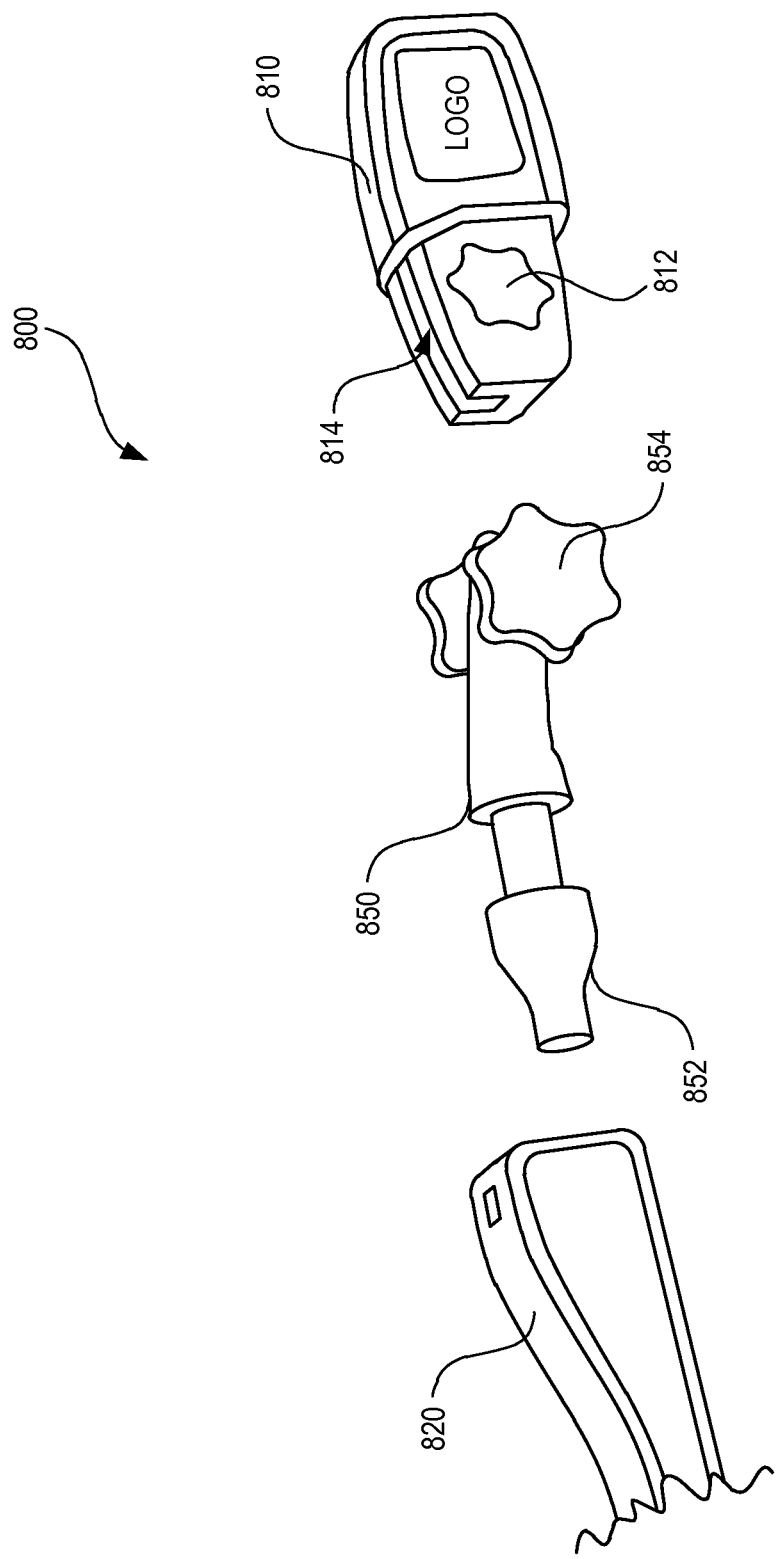

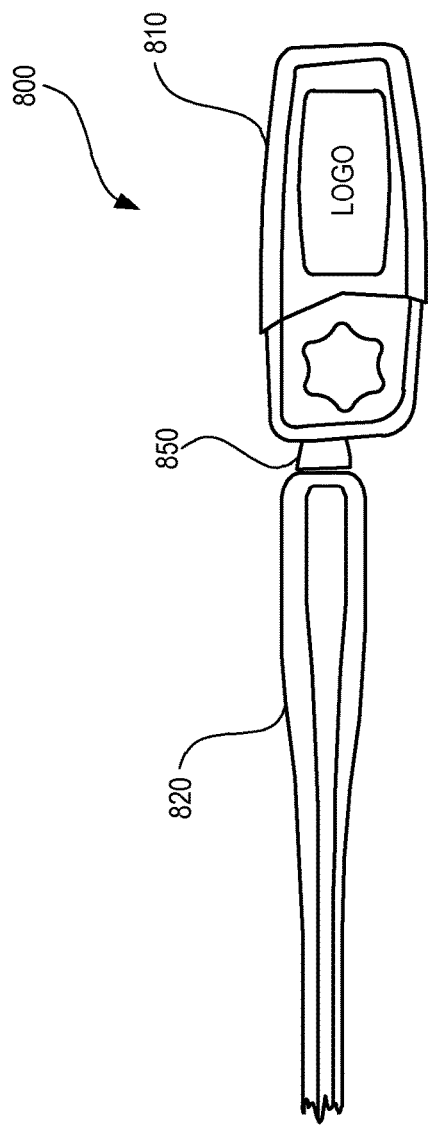
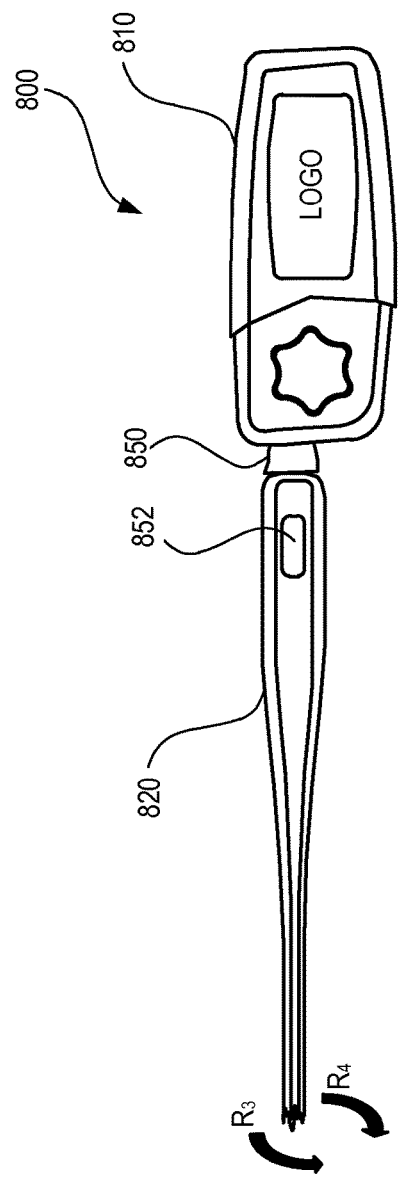
FIG. 8C
FIG. 8D

ADJUSTABLE EYEWEAR RETAINER

TECHNICAL FIELD

The present disclosure relates generally to devices for securing eyewear to the head or neck of a user. More specifically, the present disclosure relates to an adjustable tethering device for eyewear.

BRIEF DESCRIPTION OF THE DRAWINGS

Non-limiting and non-exhaustive embodiments of the disclosure are described herein, including various embodiments of the disclosure illustrated in the figures listed below.

FIG. 3A is a side view of an eyewear retainer, according to one embodiment.

FIG. 3B is another side view of the eyewear retainer of FIG. 3A

FIG. 8A is an exploded perspective view of an eyewear retainer, according to one embodiment.

FIG. 8C is another side view of the eyewear retainer of FIG. 8A.

FIG. 8D is another side view of the eyewear retainer of FIG. 8A.

DETAILED DESCRIPTION

The components of the embodiments as generally described and illustrated in the figures herein could be arranged and designed in a wide variety of different configurations. Thus, the following detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The terms "coupled to" and "coupling" refer to any form of interaction between two or more entities, including mechanical, electrical, magnetic, electromagnetic, fluid, and thermal interaction. Two components may be coupled to each other even though they are not in direct contact with each other.

Eyewear fasteners or eyeglass retaining devices are disclosed herein, and may utilize one or more securing tethers to prevent eyewear from falling off of a user. Further, several embodiments of an eyewear fastener may enable a user to position one or more securing tethers at various angles (e.g., acute angles as illustrated) relative to the temples of the eyewear coupled with an embodiment of an eyewear fastener. One or more portions of the eyewear fastener may be rotatably and/or pivotally coupled and may facilitate securing the eyewear to the user in a setting that is comfortable or otherwise desirable for the user. In various embodiments, the tether may be rigid, semi-rigid, flexible, deformable, resilient, compressible, liquid-impermeable, configured to float, configured to return to an original shape, fireproof, waterproof, heat resistant, flame resistant, magnetic, and/or have other properties suited to a particular application.

Figure 1:
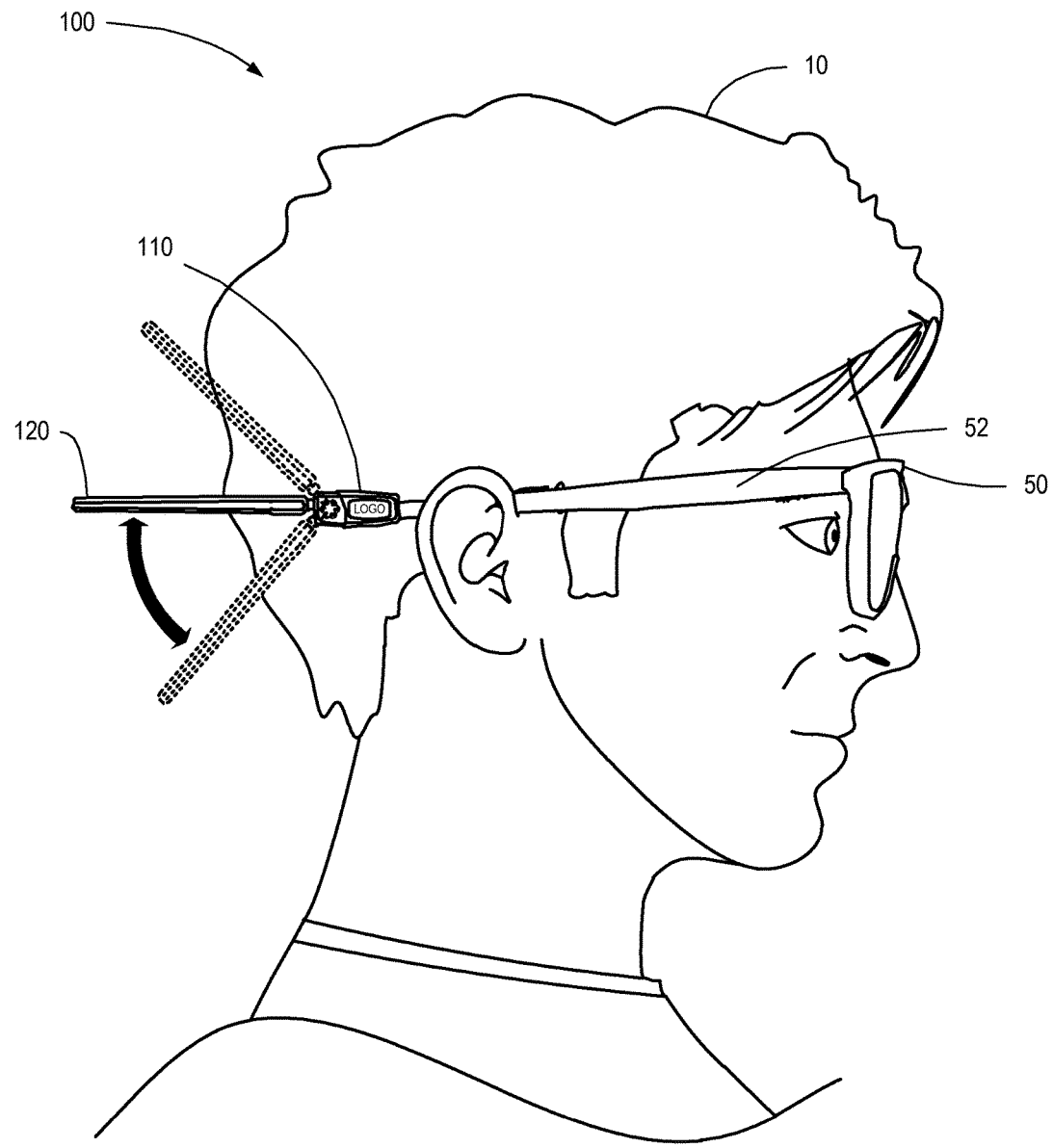
FIG. 1 is a side view of eyewear on the head of a user, the eyewear secured by an eyewear retainer, according to one embodiment.

FIG. 1 is a side view of eyewear 50 on the head of a user 10, and secured to the user 10 by an eyewear retainer 100, according to one embodiment. The eyewear retainer 100 may include at least one temple fastener 110 and a first tether 120. The temple fastener 110 may couple to the temples 52 of the eyewear 50 via a semi-flexible bore, rubberized lumen, or any other passive fastener configured to couple to the temples 52 of the eyewear 50.

The temple fastener 110 may be rotatably or pivotally coupled to the first tether 120 at a first end of the tether 120. Accordingly, the first tether 120 may be pivoted from a first position (shown in dashed lines) into a second position (shown in solid lines in FIG. 1), and may be pivoted upward from the second position into a third position (shown in dashed lines in FIG. 1). Further, the first tether 120 may be pivoted downward from the third position into the second position, and may be pivoted still further downward from the second position into the first position.

In some embodiments, the first tether 120 may be pivoted to any number of positions in between the first, second, and third positions. The number of discrete positions may depend on the number of facets, surfaces, sides, faces, and/or other shape-descriptor of a positioning member and/or positioning cavity associated with the first tether 120. In some embodiments the first tether 120 may be pivoted into positions beyond the first and/or third positions as well.

In various embodiments, the first tether 120 may be configured to continuously pivot, pivot between many discrete positions, and/or pivot between a plurality (e.g., two to eight) of discrete positions. The number of discrete pivot positions may depend on the shape of a positioning member coupled to the temple fastener 110, as described herein.

A position of the first tether 120 (and any other tethers) may be defined relative to the temple fastener 110, or may be defined relative to the head or neck of the user 10, or relative to any other suitable point of reference.

Figure 2:
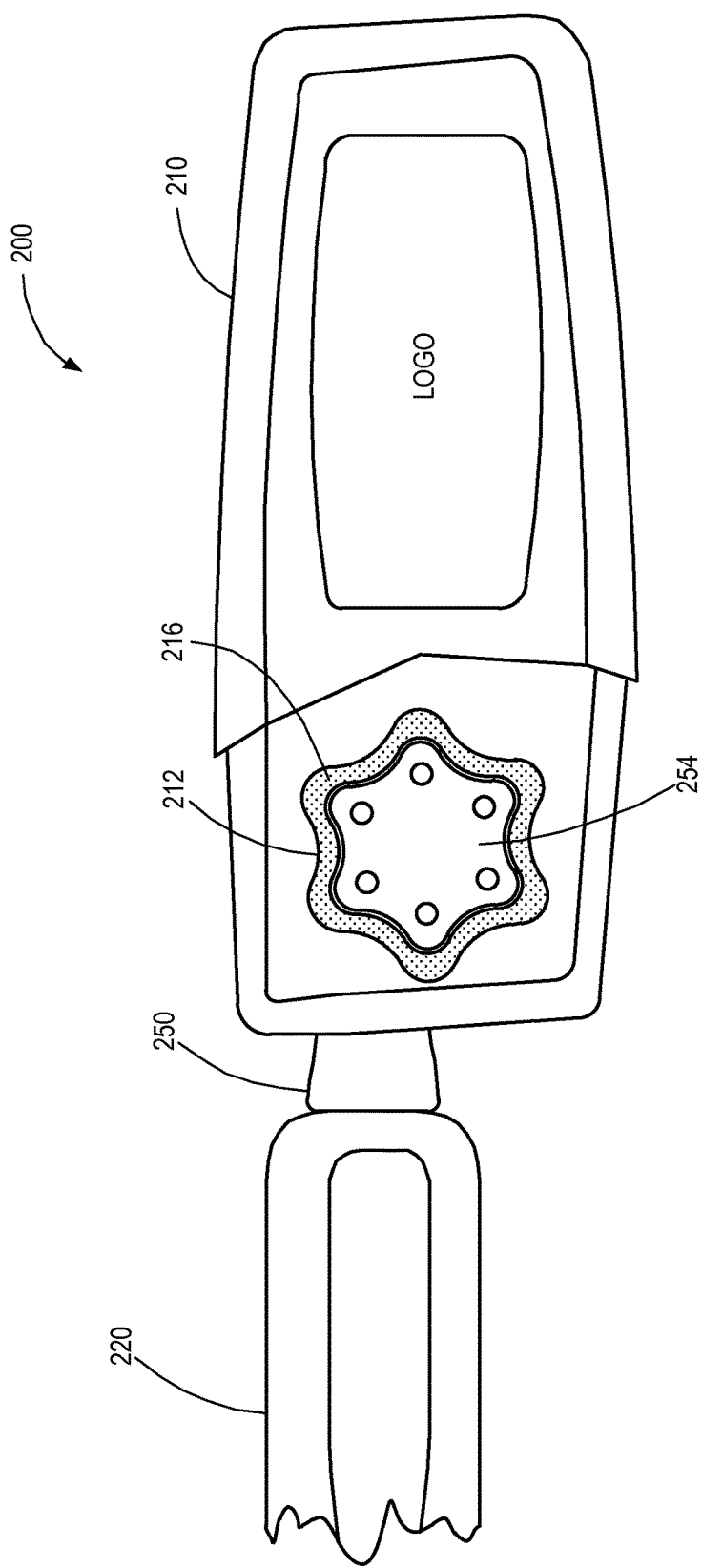
FIG. 2 is an enlarged side view of an eyewear retainer, according to one embodiment.

FIG. 2 is an enlarged side view of an eyewear retainer 200, according to one embodiment. The eyewear retainer 200 includes a temple fastener 210 rotatably coupled to a first tether 220 by a breakaway fastener 250. The breakaway fastener 250 may include a positioning member 254 disposed in a positioning cavity 212 formed by the temple fastener 210 and in contact with a flexible substrate 216.

As described, the temple fastener 210 may couple with the temple of the eyewear at a first end via a shaped or friction fit lumen. The temple fastener 210 may include a positioning cavity 212 that is shaped according to the shape of a corresponding positioning member. For example, in FIG. 2 the positioning cavity 212 is star-shaped to facilitate insertion and coupling with the positioning member 254. A flexible substrate 216 may layer an inner surface of the positioning cavity 212, or may be an inserted rubberized material with a shape corresponding to the shape of the positioning cavity 212 and to the shape of the positioning member 254.

More specifically, the sides or surfaces of the positioning cavity 212 and/or the flexible substrate 216 may define a perimeter of the position cavity 212 which may correspond to a perimeter of the positioning member 254. The number of sides (or facets, faces, surfaces, indentations, protrusions, ribs, bumps, extensions, and/or the like) defining the perimeter of the positioning cavity 212 may be equal to the number of sides defining the perimeter of the positioning member 254.

FIG. 3A is a side view of an eyewear retainer 300, according to one embodiment. The eyewear retainer 300 may include a temple fastener 310 pivotally or rotationally coupled to a first tether 320 by a breakaway fastener 350. The breakaway fastener 350 may be coupled to the first tether 320 at one end of the tether 320 and may include a positioning member 354. In FIG. 3A, the first tether 320 is disposed in a first position, or horizontally in line with the longitudinal axis of the temple fastener 310. The positioning member 354 may be rotatably positioned within the positioning cavity 312, such that rotation of the positioning member 354 may cause the first tether 320 to pivot with respect to the temple fastener 310, similar to the example shown in FIG. 1.

FIG. 3B is another side view of the eyewear retainer 300 of FIG. 3A, which illustrates the rotatable coupling between the first tether 320 and the temple fastener 310 that allows the first tether 320 to pivot with respect to the temple fastener 310. The positioning member 354 of the breakaway fastener 350 may be semi-flexible (e.g., when no flexible substrate is present) or may be of a substantially rigid material and may couple with a flexible substrate, as seen in FIG. 2. The positioning member 354 and the positioning cavity 312 may be flexible, rigid, semi-flexible, or any combination thereof. The positioning member 354 may rotate in clockwise or counterclockwise directions $R_2$, $R_1$ to cause the first tether 320 coupled to the temple fastener 310 to be pivoted in an upward direction $D_2$ or in a downward direction $D_1$ corresponding to the rotation (e.g., $R_1$ or $R_2$) of the positioning member 354.

More specifically, the flexible positioning member 354 (or in other embodiments, the flexible substrate) may partially distort (e.g., compress, extend, stretch, or bend) to allow the positioning member 354 to rotate within the positioning cavity 312 and may secure the positioning member 354 in discrete pivot positions defined by the shape of the positioning cavity 312.

Figure 4A:
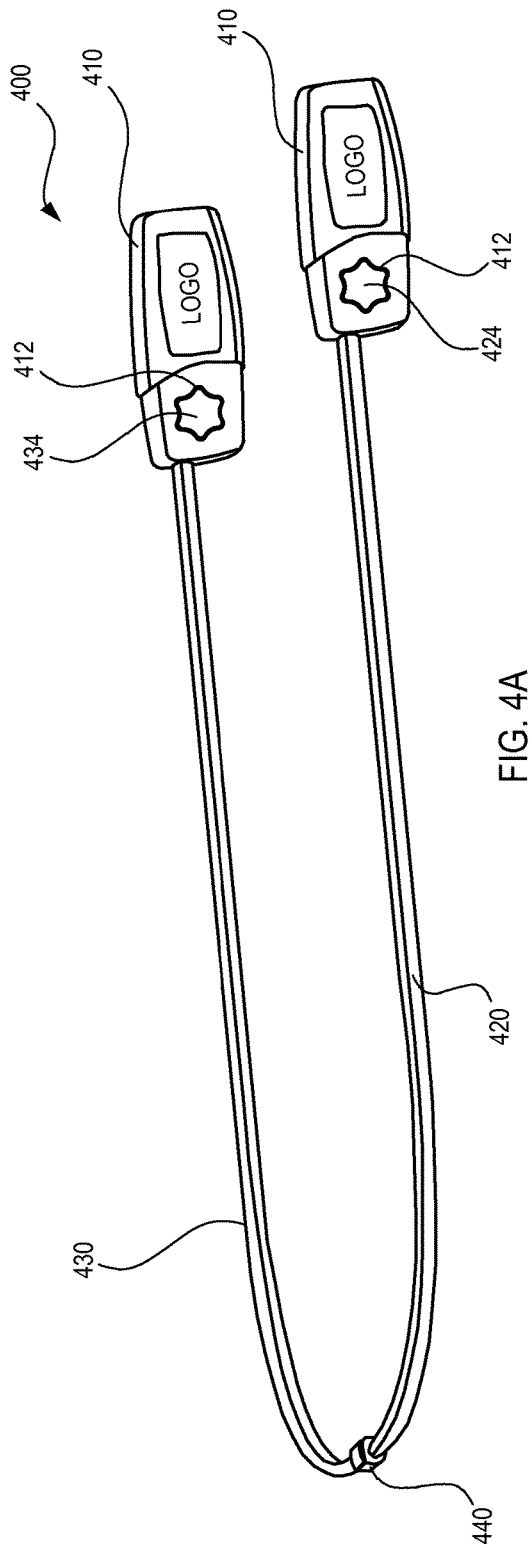
FIG. 4A is a perspective view of an eyewear retainer, according to one embodiment.
Figure 4C:
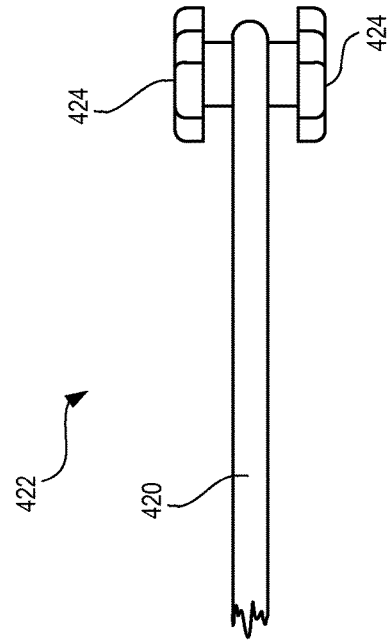
FIG. 4C is an enlarged top view of the eyewear retainer of FIG. 4A.
Figure 4B:
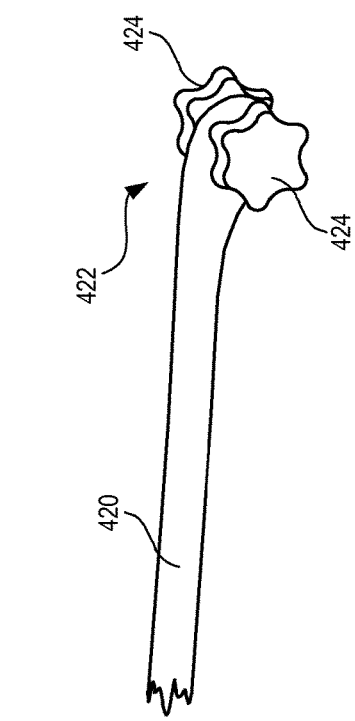
FIG. 4B is an enlarged perspective view of the eyewear retainer of FIG. 4A.

FIGS. 4A-4C are various views of an eyewear retainer 400, according to one embodiment of the present disclosure, with temple fasteners 410 rotatably coupled to a first tether 420 and a second tether 430. The tethers 420, 430 are coupled to one another at one end by a tether coupling 440, and are pivotally coupled to the temple fasteners 410 at the other end by positioning members 424, 434. In certain embodiments, the tethers 420, 430 may be described as a single tether coupled to two (e.g., first and second) temple fasteners 410 at a first end and a second end of the single tether.

As appreciable, some components described herein as separate components may be manufactured as a single component and/or permanently joined as a single component after manufacturing. Various components described herein, including tethers, positioning members, inserts within a positioning cavity, material surrounding positioning members, temple fasteners, and/or any subcomponents thereof may be manufactured using any of a wide variety of materials and/or using a wide variety of manufacturing techniques including: plastic, rubber, leather, metal, neoprene, cloth, cotton, fabric, glass, fibers, carbon fiber, glass fibers, and/or any other suitable component for any given component or subcomponent.

FIG. 4A is a perspective view of the eyewear retainer 400. FIG. 4B is an enlarged perspective view of a terminal region 422 of the first tether 420 with the positioning member 424 removed from the temple fastener 410. FIG. 4C is an enlarged top view of the terminal region 422 (e.g., positioning members 424) of the first tether 420.

Figure 5A:
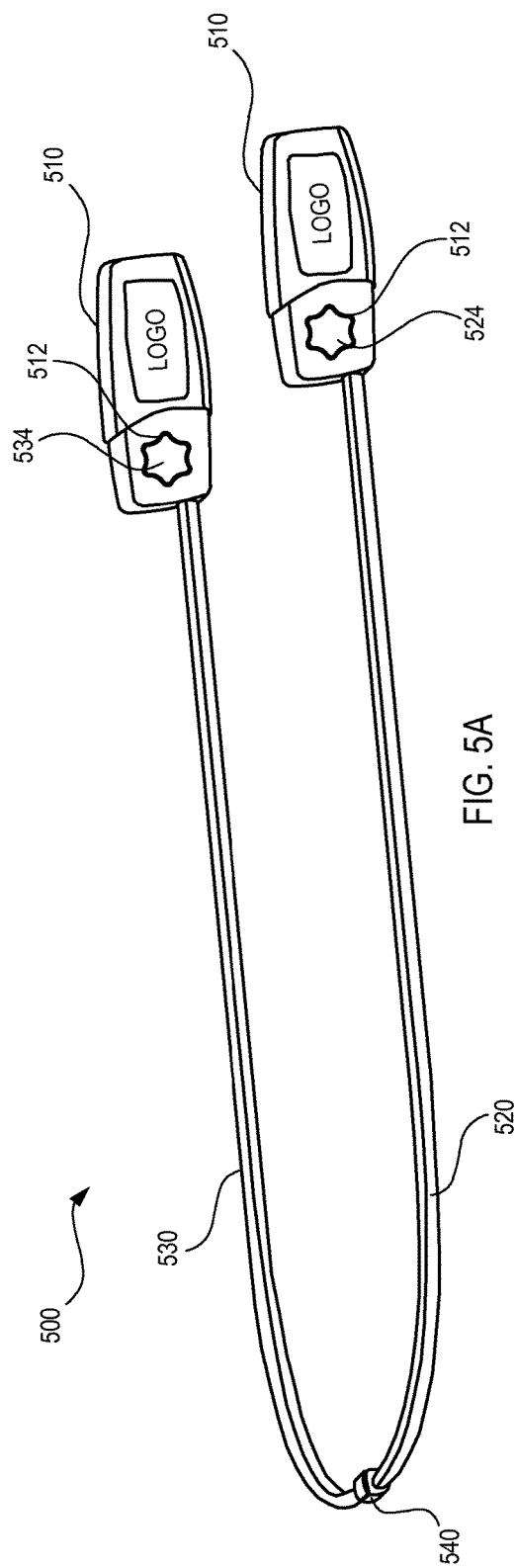
FIG. 5A is a perspective view of an eyewear retainer, according to one embodiment.
Figure 5C:
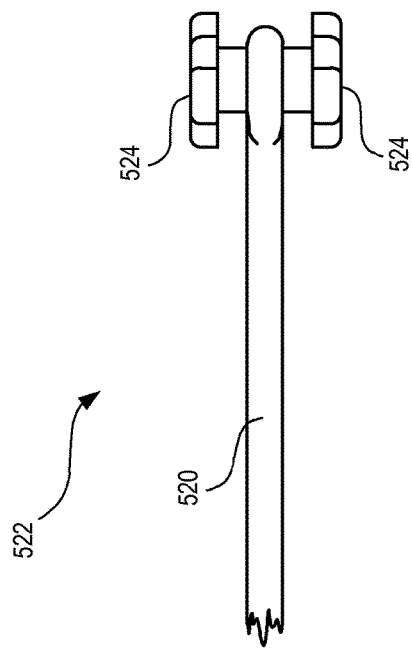
FIG. 5C is an enlarged top view of the eyewear retainer of FIG. 5A.
Figure 5B:
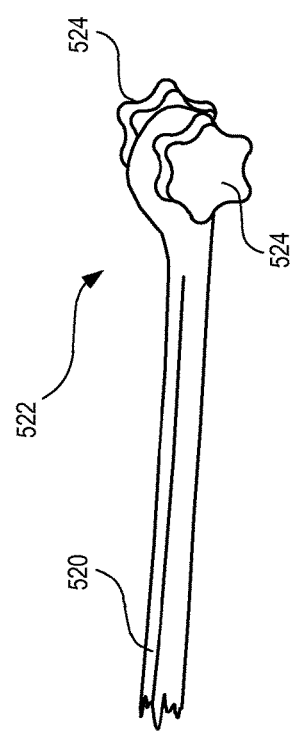
FIG. 5B is an enlarged perspective view of the eyewear retainer of FIG. 5A.

FIGS. 5A-5C are various views of an eyewear retainer 500, according to one embodiment of the present disclosure. FIG. 5A is a perspective view of the eyewear retainer 500, with temple fasteners 510, a first tether 520, a second tether 530, and tether coupling 540. FIG. 5B is an enlarged perspective view of a terminal region 522 of the first tether 520 with the positioning member 524 removed from the temple fastener 510. FIG. 5C is an enlarged top view of the terminal region 522 (e.g., positioning members 524) of the first tether 520.

The eyewear retainer 500 of FIGS. 5A-5C may be configured to operate in a manner similar to the eyewear retainer 400 of FIGS. 4A-4C. More specifically, the eyewear retainer 500 may operate to secure eyewear to a user and may allow the tethers 520, 530 to be pivoted into various positions relative to the temple fasteners 510. The tethers 520, 530 may pivot by rotating the positioning members 524, 534 of the first and second tethers 520, 530 within positioning cavities 512 of the temple fasteners 510.

Stated differently, FIGS. 5A-5C are an embodiment of an eyewear retainer 500 similar to the eyewear retainer 400 pivoted 180 degrees, and configured to operate (e.g., pivot the first and/or second tethers 320, 330 with respect to the temple fasteners 210 and secure eyewear to a user) in the arrangement shown in FIG. 5A.

Figure 6A:
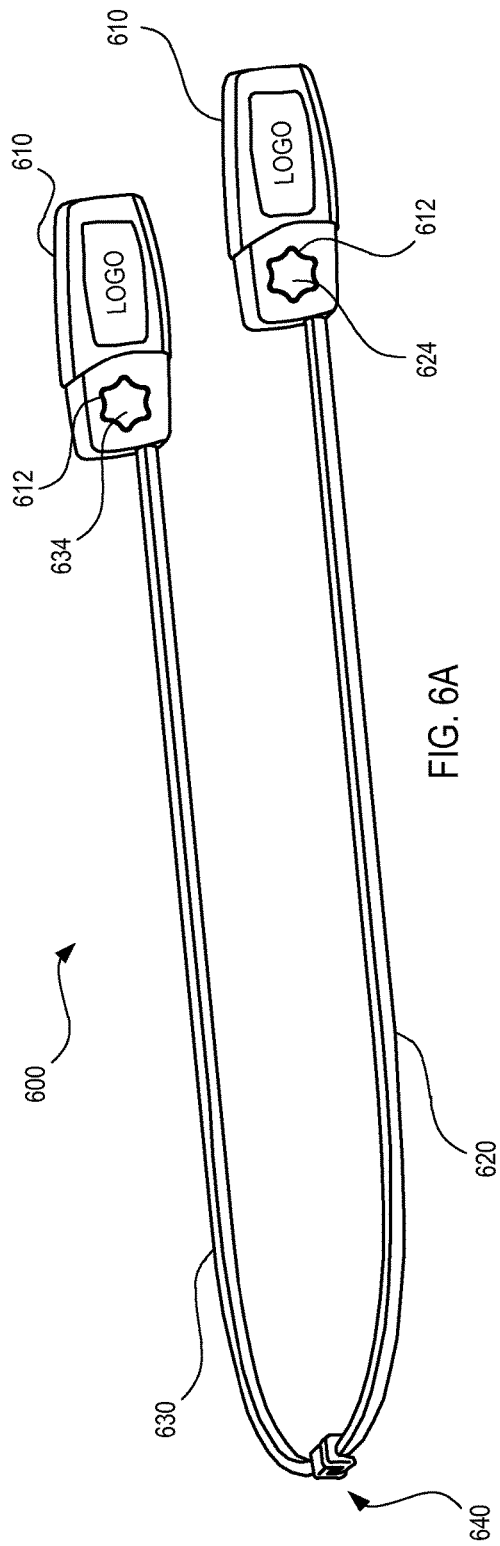
FIG. 6A is a perspective view of an eyewear retainer, according to one embodiment.
Figure 6C:
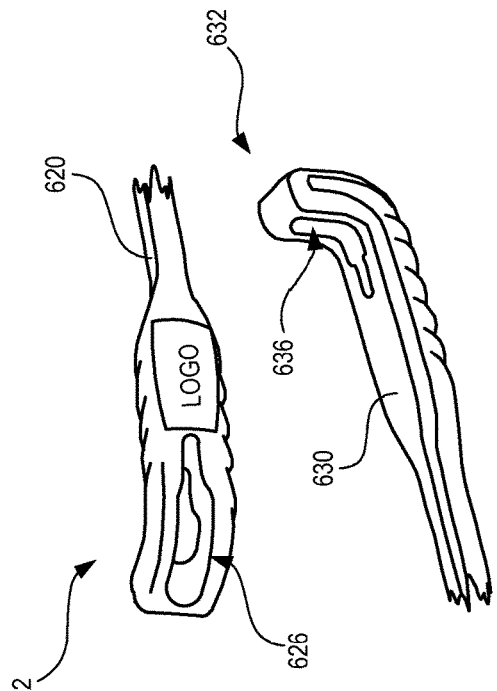
FIG. 6C is another enlarged perspective view of the eyewear retainer of FIG. 6A with two tethers of the retainer uncoupled.
Figure 6B:
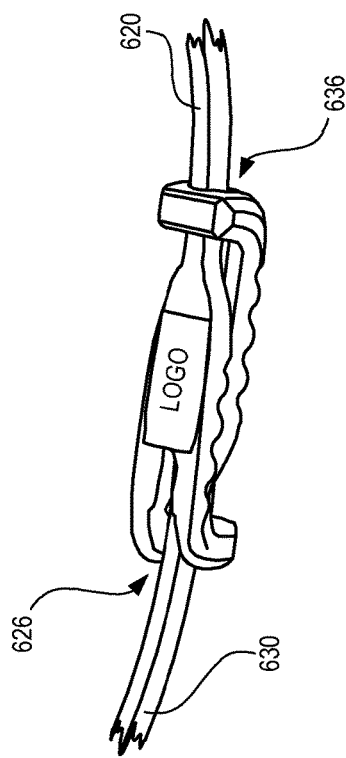
FIG. 6B is an enlarged perspective view of the eyewear retainer of FIG. 6A, with two tethers of the retainer coupled.

FIGS. 6A-6C are perspective and side views of an eyewear retainer 600 according to another embodiment of the present disclosure. FIG. 6A is a perspective view of the eyewear retainer 600, with temple fasteners 610 pivotally coupled to a first tether 620 and a second tether 630. The second tether 630 is coupled at one end to the first tether 620 (e.g., a corresponding end or terminal region of the first tether 620) via a tether coupling 640. FIG. 6B is an enlarged perspective view of the tether coupling 640 of the eyewear retainer 600, with the tethers 620, 630 coupled to each other. FIG. 6C is another enlarged perspective view of the tether coupling 640 with the tethers 620, 630 uncoupled and illustrating a first looped end 626 and a second looped end 636 formed by the first and second tethers 620, 630 respectively.

Referring generally and collectively to FIGS. 6A-6C, the tether coupling 640 may allow the length of the tethers 620, 630 to be adjusted. More specifically, a user may draw the ends of the tethers 620, 630 away from each other to cause a greater portion of each tether 620, 630 to extend from the corresponding looped ends 626, 636. Additionally, increasing the portion of a tether (e.g., the first tether 620) extending from the corresponding looped end (e.g., the second looped end 636) may cause the collective length of the tethers 620, 630 (e.g., length between the temple fasteners 610) to decrease (e.g., to accommodate a smaller sized neck or head and/or to fit closer to the back of a head or neck).

Similarly, a user may draw the ends 622, 632 of the tethers 620, 630 toward one another to decrease the amount of each tether 620, 630 extending from the looped ends 626, 636 and may increase the length of the tethers 620, 630 between the temple fasteners 610 (e.g., to accommodate a larger sized neck or head and/or to loosen the tethers 620, 630).

Figure 7A:
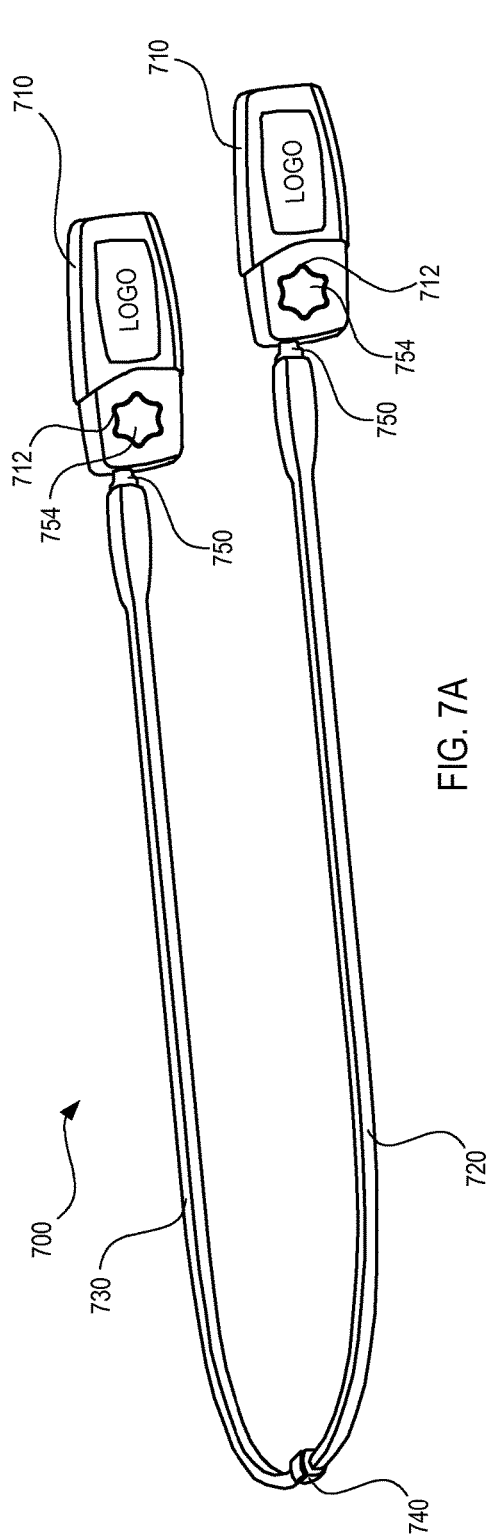
FIG. 7A is a perspective view of an eyewear retainer, according to one embodiment.
Figure 7C:
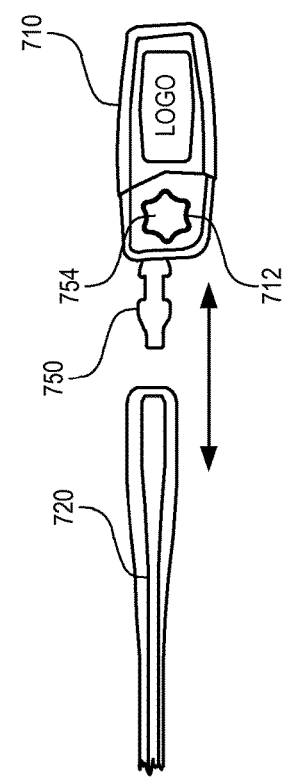
FIG. 7C is another side view of the retainer of FIG. 7A.
Figure 7B:
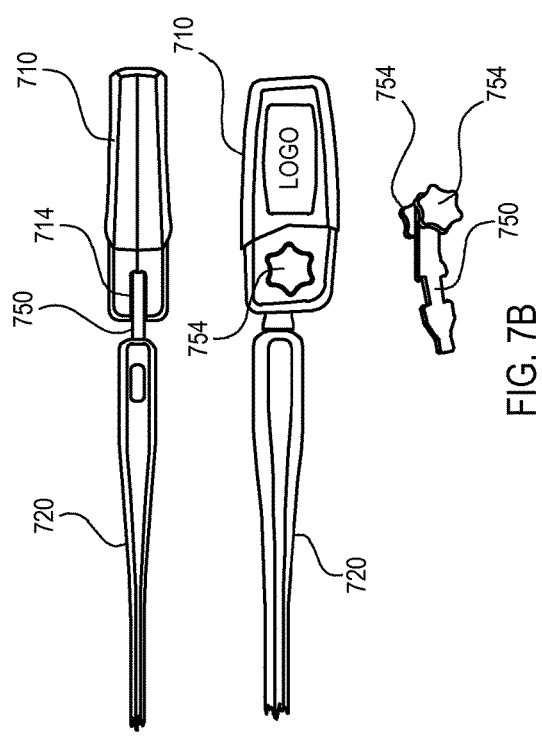
FIG. 7B is a side and perspective view of the retainer of FIG. 7A.

FIG. 7A is a perspective view of an eyewear retainer 700, according to another embodiment of the present disclosure. The retainer 700 may include a plurality of temple fasteners 710 rotatably coupled to tethers 720, 730 by a breakaway fastener 750. The breakaway fastener 750 may include a positioning member 754 to allow the tethers 720, 730 to be configured in various different positions or angles relative to the temple fasteners 710. FIG. 7B is a side and perspective view of the eyewear retainer 700. FIG. 7C is another side view of the eyewear retainer 700 of FIG. 7A with the breakaway fastener 750 coupled to the temple fastener 710 and the breakaway fastener 750 uncoupled from the tether 720.

The breakaway fastener 750 of FIGS. 7A-7C may be configured to allow the tethers 720, 730 to uncouple from or release the temple fasteners 710 and may prevent discomfort or injury of the user (e.g., in the case of one or more tethers 720, 730 being snagged by a fixed object as the user moves away from the fixed object).

The portion of the breakaway fastener 750 configured to couple with a tether 720, 730 may be formed by a flexible or non-rigid material with shaped flanges or protrusions, as may be observed in FIG. 7B. The shape of the breakaway fastener 750 may allow it to couple with a tether 720, 730 on one end while still enabling decoupling or releasing of the breakaway fastener 750 and a tether 720, 730 in response to a sufficiently large force, as shown in FIG. 7C.

As described, the breakaway fastener 750 may uncouple from one or more tethers 720, 730 and may remain coupled to the temple fastener 710. More specifically, for a breakaway fastener 750 coupled to a temple fastener 710, the positioning member 754 of the breakaway fastener 750 may be disposed within a positioning cavity 712 formed by the temple fastener 710.

FIG. 8A is an enlarged and exploded view of an eyewear retainer 800, according to another embodiment. More specifically, the eyewear retainer 800 may include a tether 820, a breakaway fastener 850, and a temple fastener 810.

In FIG. 8A, the breakaway fastener 850 is uncoupled from the tether 820 and the temple fastener 810. The breakaway fastener 850 may include a first end 852 which may be made of a plastic or semi-flexible material to facilitate inserting the first end 852 into a corresponding aperture of the first tether 820. During or immediately prior to insertion of the breakaway fastener 850 into the first tether 820 one or more ridges or extended portions of the first end 852 of the breakaway fastener 850 may be compressed or otherwise distorted.

Following insertion of the breakaway fastener 850, the previously compressed or otherwise distorted ridges may expand or at least partially return to their prior configuration, and may cause the tether 820 to exert a compressional force on the first end 852. The compressional force of the first tether 820 may cause the breakaway fastener 850 to remain coupled to the tether 820 until a sufficiently large force is exerted on either the tether 820 or the breakaway fastener 850 to cause them to release or uncouple.

The temple fastener 810 may include a rotation channel or aperture 814 to facilitate rotation or pivoting of the tether 820 to transition from one position to another (possibly angled) position relative to the temple fastener 810. For example, the breakaway fastener 850 may couple with the temple fastener 810 with the positioning member 854 disposed within the positioning cavity 812.

The positioning member 854 may rotate or pivot within the positioning cavity 812 to cause the rest of the breakaway fastener 850 and any tether coupled to the breakaway fastener 850 to pivot and transition into a more upward or downward position based on the rotation or pivoting of the positioning member 854 within the positioning cavity 812.

Figure 8B:
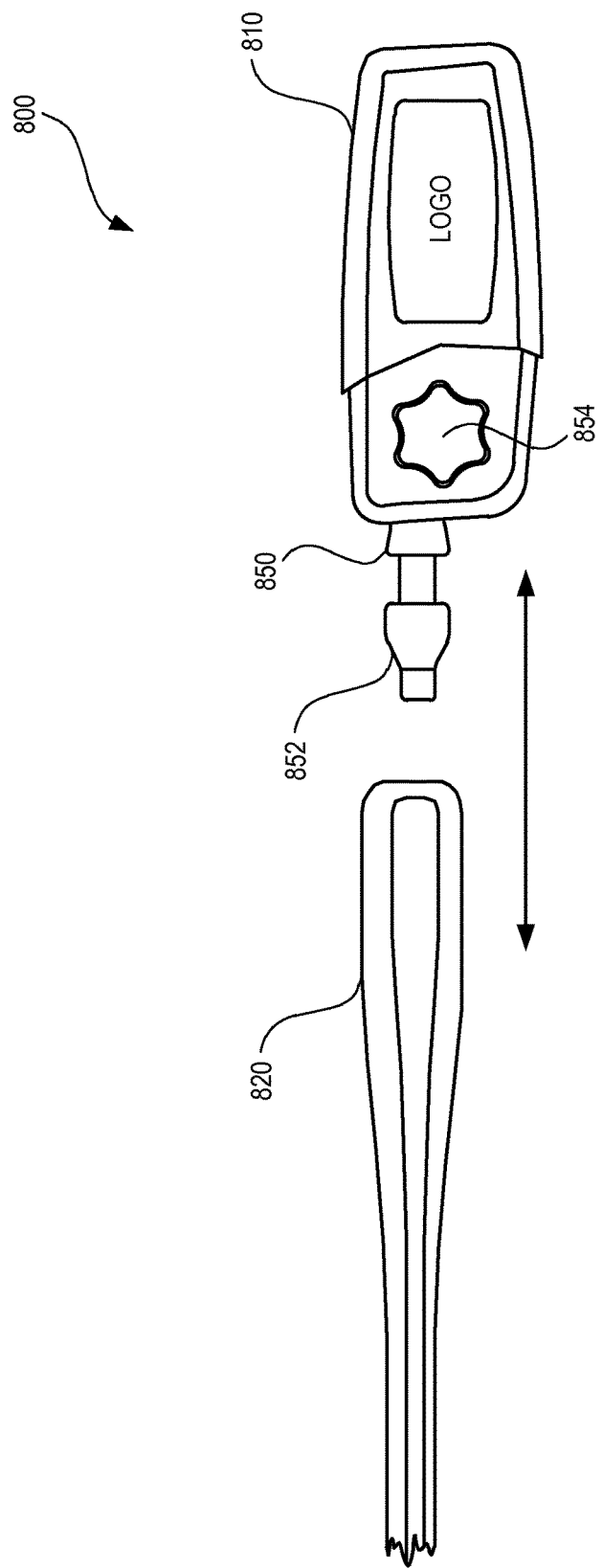
FIG. 8B is a side view of the eyewear retainer of FIG. 8A.

FIG. 8B is a side view of the eyewear retainer 800 with the breakaway fastener 850 coupled to the temple fastener 810 by the positioning member 854 disposed in the temple fastener 810. Further, the first end 852 of the breakaway fastener 850 is uncoupled from the tether 820 (e.g., in response to a user or fixed object pulling on the tether 820 and/or the temple fastener 810 or attached eyewear). FIG. 8C is another side view of the eyewear retainer 800. FIG. 8D is another side view of the eyewear retainer 800 with the tether 820 pivoted relative to the temple fastener 810. The first end 852 of the breakaway fastener 850 may include a cylindrical shape. The cylindrically shaped first end 852 may allow the tether 820 and the breakaway fastener 850 to spin or rotate relative to one another (e.g., rotating the tether 820 in the direction $R_3$ or $R_4$). Independently, the tether 820 may be pivoted relative to the temple fastener 810.

FIGS. 9A-9F are several side views of various embodiments of an eyewear retainer which collectively and generally illustrate that a positioning member and a corresponding positioning cavity and the perimeters thereof need not be a single shape, but may include any of a wide variety of suitable shapes. For example, the perimeters of a positioning cavity and the perimeter of a corresponding positioning member may be configured in a triangular, square, pentagonal, hexagonal, heptagonal, octagonal, nonagonal, decagonal, or star-like shape.

Figure 9A:
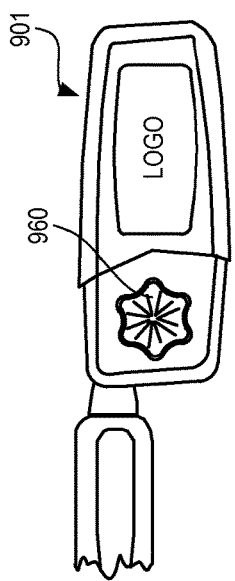
FIG. 9A is a side view of an eyewear retainer, according to one embodiment.
Figure 9B:
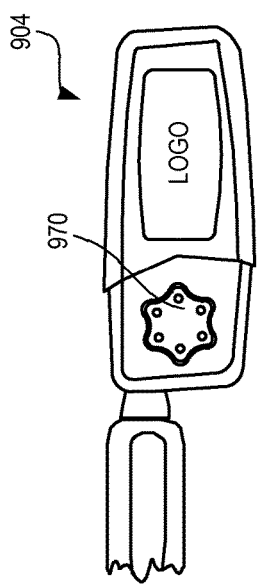
FIG. 9B is another side view of the eyewear retainer, according to one embodiment.
Figure 9C:
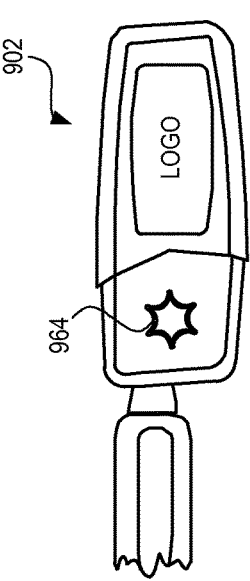
FIG. 9C is another side view of an eyewear retainer, according to one embodiment.
Figure 9D:
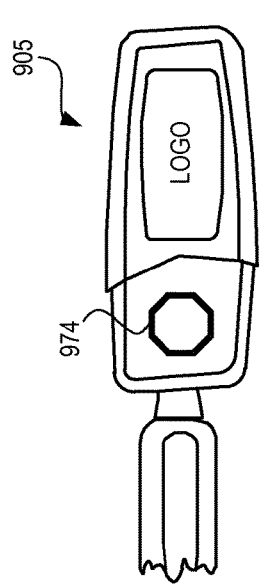
FIG. 9D is another side view of an eyewear retainer, according to one embodiment.
Figure 9E:
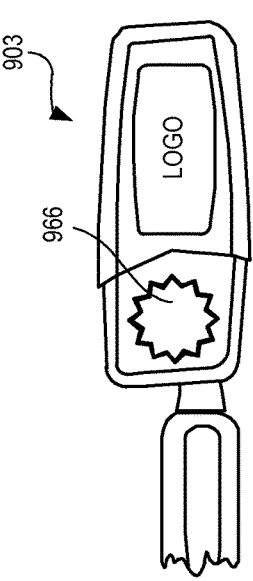
FIG. 9E is another side view of an eyewear retainer, according to one embodiment.
Figure 9F:
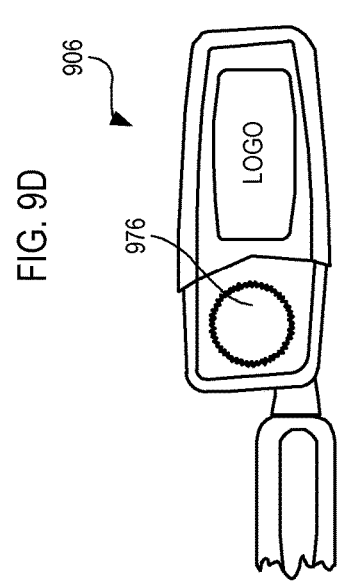
FIG. 9F is another side view of an eyewear retainer, according to one embodiment.

Further, FIGS. 9A-9F illustrate that a breakaway fastener may couple with a temple fastener 910 at any suitable elevation or vertical position of the temple fastener 910. For example, FIG. 9A illustrates a breakaway fastener coupled to a temple fastener at a high elevation, FIG. 9D illustrates a breakaway fastener coupled to a temple fastener at a center elevation along the longitudinal axis of the temple fastener, and FIG. 9F illustrates a breakaway fastener coupled to a temple fastener at a low elevation. FIG. 9A is a side view of an eyewear retainer 901, according to one embodiment, with a star-shaped positioning member 960.

FIG. 9B is a side view of an eyewear retainer 904, according to another embodiment with another star-shaped positioning member 970. FIG. 9C is a side view of an eyewear retainer 902, according to another embodiment with a concave star-shaped positioning member 964. FIG. 9D is a side view of an eyewear retainer 905, according to another embodiment with an octagon-shaped positioning member 974.

FIG. 9E is a side view of an eyewear retainer 903, according to another embodiment with another star-shaped positioning member 966, the positioning member 966 configured with a larger number of sides. FIG. 9F is a side view of an eyewear retainer 906, according to another embodiment with an approximately circular-shaped positioning member 976 configured to include a still greater number of sides in the form of surface ridges, and/or a frictional surface on one of the aperture(s) in the eyewear retainer 906 and/or the approximately circular-shaped positioning member 976.

Figure 10A:
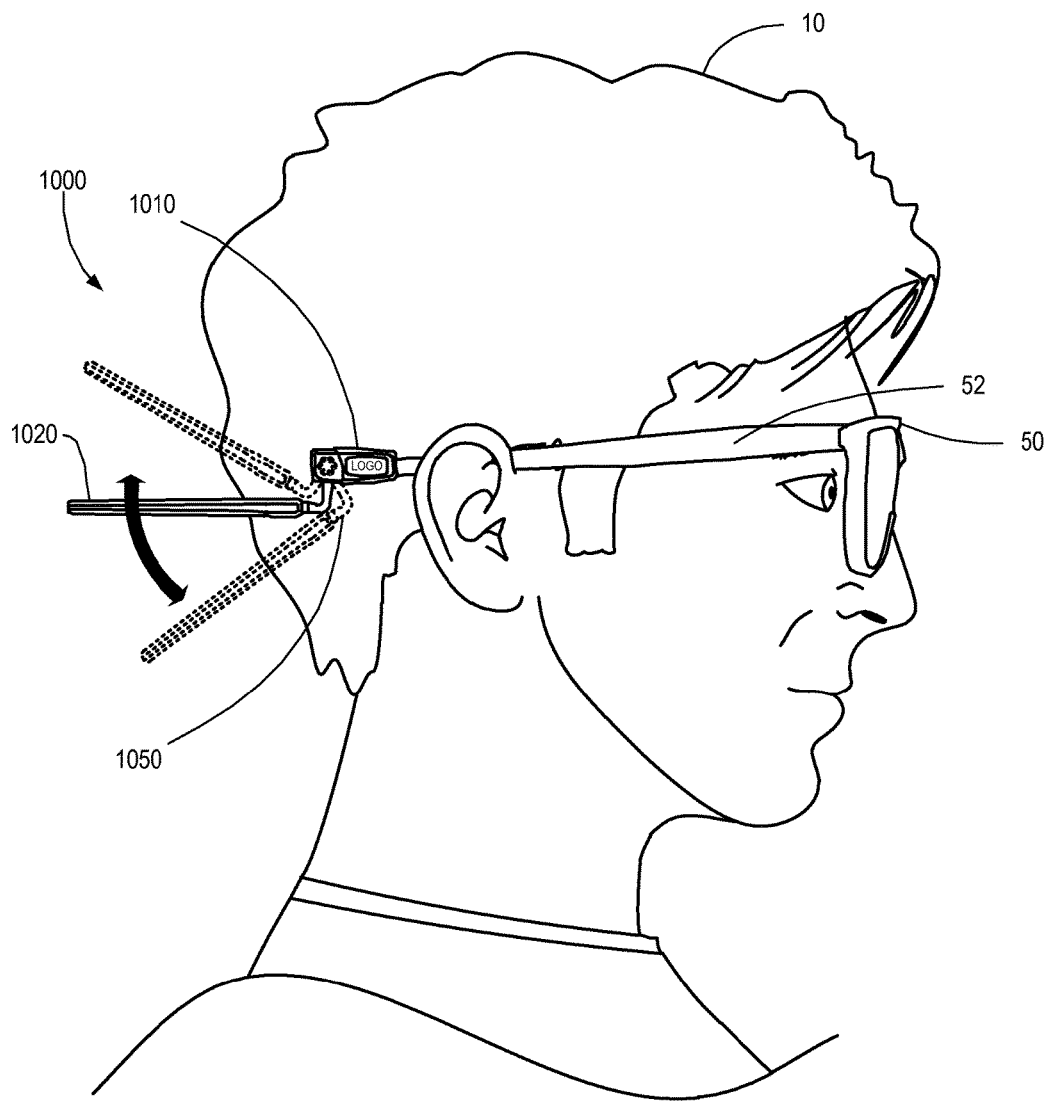
FIG. 10A illustrates a side view of an eyewear retainer being worn by a user.

FIG. 10A is another side view of eyewear 50 on the head of a user 10, and secured to the user 10 by an eyewear retainer 1000, according to one embodiment. The eyewear retainer 1000 may include at least one temple fastener 1010 coupled to a temple 52 of the eyewear 50 at one end. Further, the eyewear retainer 1000 may include a first tether 1020 coupled to the temple fastener 1010 opposite the temple 52, by an elevation-adjusted breakaway member 1050 (or an integrated terminal region of the tether 1020).

The elevation-adjusted breakaway member 1050 can extend away from the temple fastener 1010 in a direction that is substantially parallel to the ground with the user's head looking forward. More specifically, the elevation-adjusted breakaway member 1050 may extend downward (e.g., toward the shoulders of the user 10), as shown in FIG. 10A, or may extend upward (e.g., in the opposite direction), as shown in FIG. 10A.

In other embodiments of the eyewear retainer 1000, the elevation-adjusted breakaway member 1050 may extend from the temple fastener 1010 at an angle that is less than 90 degrees or at an angle that is greater than 90 degrees. In yet other embodiments, the elevation-adjusted breakaway member 1050 may extend away from the temple fastener 1010 in an arc or curve shape. In any of the above embodiments, the angled or curved elevation-adjusted breakaway member 1050 may extend away from the temple fastener 1010 in an approximately downward direction (e.g., toward the shoulders of the user) or in an approximately upward (e.g., opposite) direction.

As described herein, the elevation-adjusted breakaway member 1050 can enable the temple fastener 1010 to be rotatably or pivotally coupled to the first tether 1020. Accordingly, the first tether 1020 may be pivoted upward from a first position (shown in dashed lines in FIG. 10A) into a second position (shown in solid lines in FIG. 10A), and may be pivoted still further upward from the second position into a third position (shown in dashed lines in FIG. 10A). Additionally, the first tether 1020 may be pivoted downward from the third position into the second position and may be pivoted still further downward from the second position into the first position.

In other embodiments, the position of the first tether 1020 shown in solid lines in FIG. 10A may be referred to as a first position, with the other positions as a second and third position. Each of the positions of the first tether 1020 may be described as a first, second, or third position. The various positions of the first tether 1020 need not be described or enumerated with reference to a particular pivoting order (e.g., upward or downward).

Figure 10B:
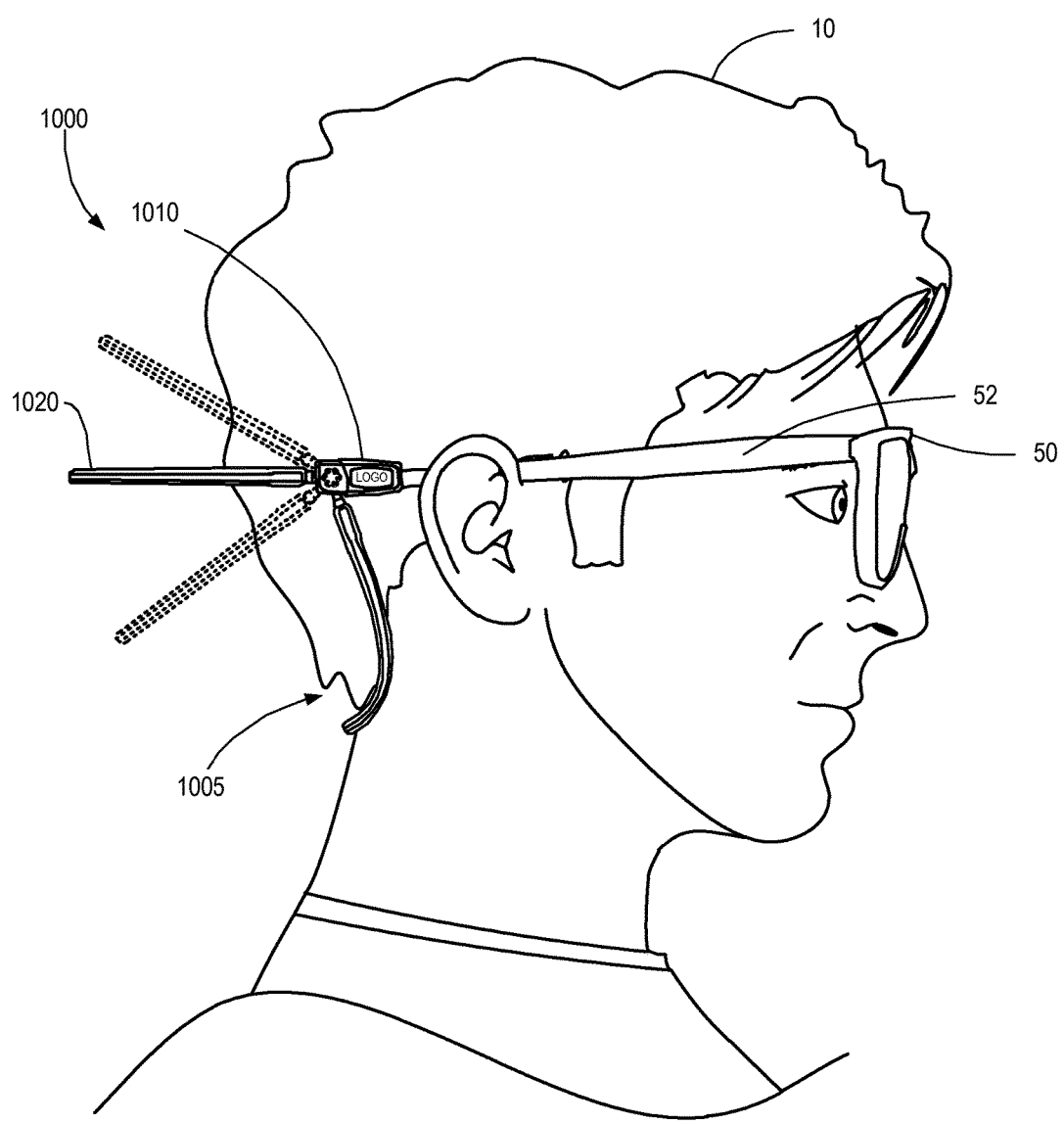
FIG. 10B illustrates another side view of an eyewear retainer being worn by a user.

FIG. 10B is another side view of the eyewear 50 worn on the head of the user 10, and secured to the user 10 by the eyewear retainer 1000. The temple fastener 1010 is coupled to a temple 52 of the eyewear 50 at one end and the eyewear retainer 1000 is shown disposed in a forth position 1005. When the eyewear retainer 1000 is in the fourth position 1005 the tether 1020 may be pivoted downward until the tether 1020 abuts and/or is in close proximity with the neck of the user 10. Further, the tether 1020 may pivot relative to the temple fastener 1010 into the fourth position 1005 from any other position and vice versa. In certain embodiments, the forth position 1005 of the eyewear retainer 1000 may also be a storage configuration or storage position of the eyewear retainer 1000.

In various embodiments, the fourth position 1005, in which the tether 1020 abuts or is in close proximity to the neck or lower portion of the head of the user 10, the tether 1020 may act to secure the eyewear 1150 securely or snugly against the face of the user 10.

Figure 11:
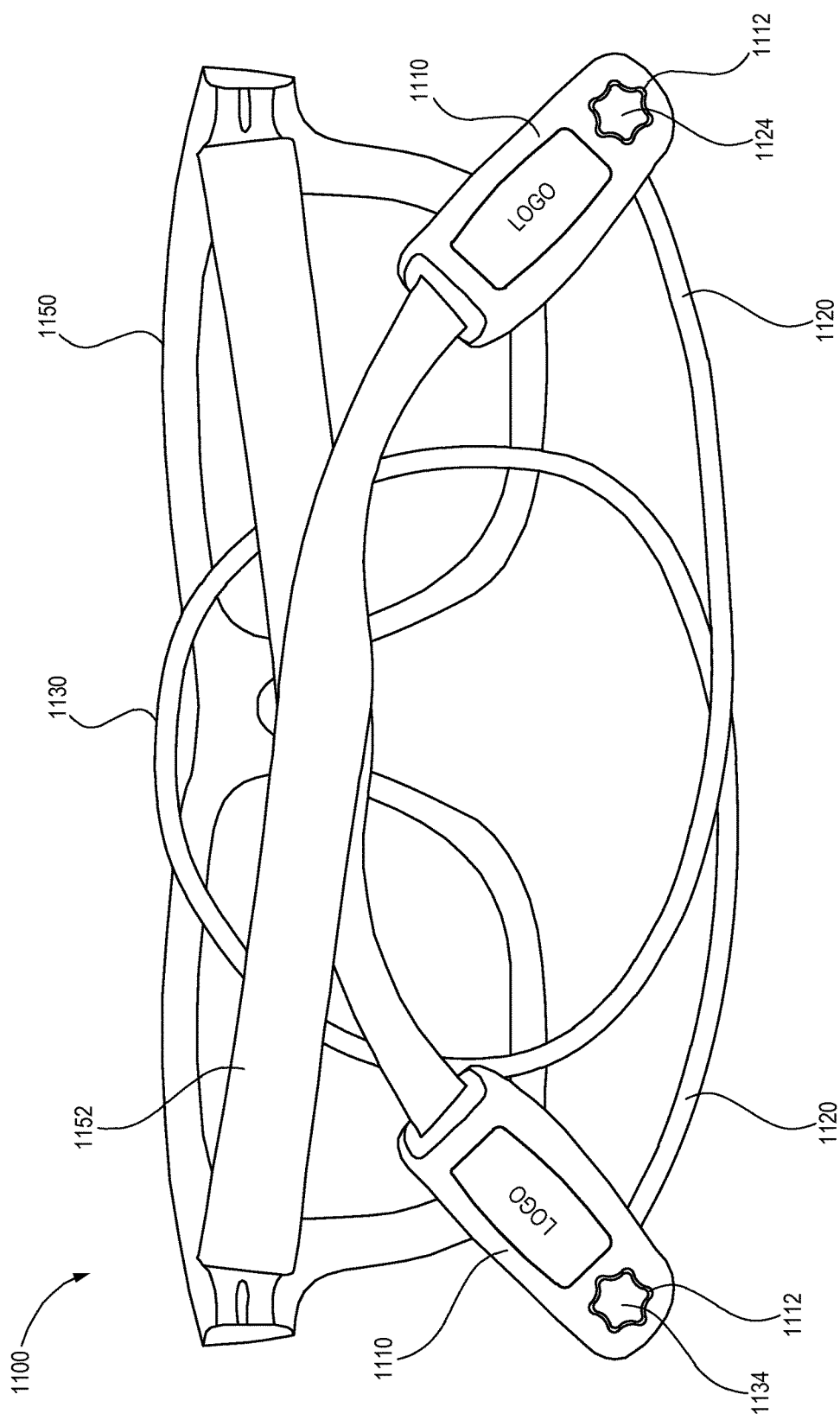
FIG. 11 illustrates a perspective view of an eyewear retainer disposed in a storage position.

FIG. 11 is another view of an eyewear retainer 1100 in a storage configuration, according to one embodiment. The eyewear retainer 1100 is shown in a storage configuration while coupled to temples 1152 of eyewear 1150 via the temple fasteners 1110. A plurality of positioning members 1124, 1134 rotatably and/or or rotatably couple the temple fasteners 1110 to each ends of a tether 1120. The positioning members 1124, 1134 may be defined by the tether 1120 (e.g., at the terminal regions or the ends of the tether), or may be a component of a breakaway fastener coupled to the tether 1120.

As described herein, the positioning members 1124, 1134 may rotate within positioning cavities 1112 to cause the tether 1120 to pivot until it is disposed in a storage position, as shown in FIG. 11. The tether 1120 may be sufficiently flexibly to be wrapped or looped to facilitate a compact storage of the eyewear 1150 while coupled to the eyewear retainer 1100. The tether 1120 may be sufficiently resilient with an elasticity that allows the tether 1120 (e.g., exhibit a shape memory) to return to an original shape (e.g., an arc).

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

What is claimed is:

1. An eyewear retainer comprising:
a tether having a first end and a second end;
a first temple fastener for connecting the first end of the tether to a first temple of eyewear;
a second temple fastener for connecting the second end of the tether to a second temple of the eyewear;
a first positioning cavity in the first temple fastener, wherein the first positioning cavity is defined by at least three sides forming a perimeter of a cavity;
a second positioning cavity in the second temple fastener, wherein the second positioning cavity is defined by at least three sides forming a perimeter of a cavity;
a first positioning member connected to the first end of the tether configured to interface with the first positioning cavity in the first temple fastener, wherein the first positioning member is defined by at least three sides corresponding to the perimeter defining the first positioning cavity, wherein the first positioning member is laterally offset from the first end of the tether; and
a second positioning member connected to the second end of the tether configured to interface with the second positioning cavity in the second temple fastener, wherein the second positioning member is defined by at least three sides corresponding to the perimeter defining the second positioning cavity, wherein the second positioning member is laterally offset from the second end of the tether; and
wherein the first and second positioning members are configured to rotate within the first and second positioning cavities, respectively, into at least two discrete rotational positions, wherein the tether extends from the first and second temple fasteners at a first angle in a first rotational position, and wherein the tether extends from the first and second temple fasteners at a second angle in a second rotational position.

2. An eyewear retainer comprising:
a tether having a first end and a second end;
a first temple fastener for connecting the first end of the tether to a first temple of eyewear;
a second temple fastener for connecting the second end of the tether to a second temple of the eyewear;
a first positioning cavity in the first temple fastener, wherein the first positioning cavity is defined by at least three surfaces forming a perimeter of a cavity; and
a first positioning member connected to the first end of the tether configured to interface with the first positioning cavity in the first temple fastener, wherein the first positioning member is defined by at least three surfaces corresponding to the perimeter defining the first positioning cavity, wherein the first positioning member is laterally offset from the first end of the tether; and
wherein the first positioning member is configured to rotate within the first positioning cavity into at least two discrete rotational positions, wherein the tether extends from the first temple fastener at a first angle in a first rotational position, and wherein the tether extends from the first temple fastener at a second angle in a second rotational position.

3. The eyewear retainer of claim 2, wherein at least one of the three surfaces of at least one of the first positioning member and the positioning cavity is curved.

4. The eyewear retainer of claim 2, wherein the first positioning cavity comprises an aperture.

5. The eyewear retainer of claim 2, wherein the first positioning member is integral with the first end of the tether.

6. The eyewear retainer of claim 2, further comprising a second positioning cavity in the second temple fastener, wherein the second positioning cavity is defined by at least three surfaces forming a perimeter of a cavity; and
a second positioning member connected to the second end of the tether configured to interface with the second positioning cavity in the second temple retainer, wherein the second positioning member is defined by at least three sides corresponding to the perimeter defining the second positioning cavity, and
wherein the second positioning member is configured to rotate within the second positioning cavity into at least two discrete rotational positions, wherein the tether extends from the first and second temple fasteners at a first angle in a first rotational position, and wherein the tether extends from the first and second temple fasteners at a second angle in a second rotational position.

7. The eyewear retainer of claim 6, wherein the first positioning member is integral with the first end of the tether and the second positioning member is integral with the second end of the tether.

8. The eyewear retainer of claim 7, wherein the first and second positioning members are configured to extend away from the first and second temple fasteners in a downward and substantially perpendicular direction.

9. The eyewear retainer of claim 2, wherein the first positioning member is configured as a breakaway portion to enable the first positioning member to release and uncouple from the first end of the tether.

10. The eyewear retainer of claim 9, wherein the tether and the breakaway portion are further configured to rotate with respect to one another.

11. The eyewear retainer of claim 10, wherein the breakaway portion extends away from the first temple fastener in a downward and substantially perpendicular direction.

12. The eyewear retainer of claim 2, wherein the tether further comprises a first portion and a second portion, the first portion defining the first end of the tether and a looped end opposite the first end and the second portion defining the second end of the tether and a looped end opposite the second end, and
wherein the looped ends of the first and second portions are configured to slide together to adjust the total length of the tether.

13. The eyewear retainer of claim 2, wherein the first temple fastener further comprises an aperture on an end to receive the first temple of the eyewear and retain the first temple via a friction fit, and
wherein the second temple fastener further comprises an aperture on an end to receive the second temple of the eyewear and retain the second temple via a friction fit.

14. The eyewear retainer of claim 2, wherein the number of surfaces defining the first positioning member is the same as the number of surfaces defining the first positioning cavity.

15. The eyewear retainer of claim 2, wherein the perimeter of the first positioning cavity is configured in one of a triangular, square, pentagonal, hexagonal, heptagonal, octagonal, nonagonal, decagonal, and star-like shape.

16. The eyewear retainer of claim 2, wherein the perimeter of the first positioning member is configured in one of a triangular, square, pentagonal, hexagonal, heptagonal, octagonal, nonagonal, decagonal, and star-like shape.

17. The eyewear retainer of claim 2, wherein the tether is further configured to extend parallel to the longitudinal axis of the first temple fastener when in the first position, and when in the second configuration to extend in at least one of upward at an acute angle relative to the longitudinal axis of the first temple fastener and downward at an acute angle relative to the longitudinal axis of the first temple fastener.

18. The eyewear retainer of claim 2, wherein the tether is configured to pivot between at least three positions: a first position parallel to the longitudinal axis of the first temple fastener, a second position forming an acute angle oriented upward from the longitudinal axis of the first temple fastener, and a third position forming an acute angle downward from the longitudinal axis of the first temple fastener.

19. The eyewear retainer of claim 2, wherein the tether is configured to be pivoted to a plurality of discrete angles relative to the first temple fastener based on the number of surfaces defining the first positioning cavity and the number of surfaces defining the first positioning member.

20. An eyewear retainer comprising:
a tether having a first end and a second end;
a first temple fastener for connecting the first end of the tether to a first temple of the eyewear;
a second temple fastener for connecting the second end of the tether to a second temple of the eyewear;
a first portion of a first positioning means associated with the first temple fastener; and
a second portion of the first positioning means associated the first end of the tether, wherein the first positioning means is configured to allow the tether to pivot relative to the first temple fastener into at least two discrete rotational positions, wherein the first positioning means is laterally offset from the first end of the tether.

* * * * *